United States Patent
Shimizu

(10) Patent No.: US 11,664,158 B2
(45) Date of Patent: May 30, 2023

(54) METHOD OF MANUFACTURING COIL FOR TORQUE SENSOR

(71) Applicant: PROTERIAL, LTD., Tokyo (JP)

(72) Inventor: Hiroki Shimizu, Tokyo (JP)

(73) Assignee: Proterial, Ltd., Tokyo (JP)

(*) Notice: Subject to any disclaimer, the term of this patent is extended or adjusted under 35 U.S.C. 154(b) by 403 days.

(21) Appl. No.: 16/789,653

(22) Filed: Feb. 13, 2020

(65) Prior Publication Data

US 2020/0265995 A1   Aug. 20, 2020

(30) Foreign Application Priority Data

Feb. 14, 2019 (JP) .............................. JP2019-024397

(51) Int. Cl.
*H01F 41/096* (2016.01)
*G01L 3/10* (2006.01)
*H01F 41/066* (2016.01)
*H01F 41/069* (2016.01)

(52) U.S. Cl.
CPC ............ *H01F 41/066* (2016.01); *G01L 3/102* (2013.01); *H01F 41/069* (2016.01); *H01F 41/096* (2016.01); *Y10T 29/49071* (2015.01)

(58) Field of Classification Search
CPC .... H01F 41/096; H01F 41/066; H01F 41/069; Y10T 29/49071; G01L 3/102
See application file for complete search history.

(56) References Cited

U.S. PATENT DOCUMENTS 7,201,344 B2 * 4/2007 Higeta .................. H01F 41/069
                                                         242/444.4
2016/0305833 A1   10/2016   Nakamura

FOREIGN PATENT DOCUMENTS

JP   2016200552 A   12/2016
JP   2018181948 A * 11/2018

OTHER PUBLICATIONS

B. Pressly, "Suggestions for winding tooling designs," Proceedings: Electrical Insulation Conference and Electrical Manufacturing and Coil Winding Technology Conference (Cat. No. 03CH37480), 2003, pp. 531-534, doi: 10.1109/EICEMC.2003.1247943. (Year: 2003).*
Machine Translation of Japanese Patent Publication, JP 2016-200552, Mar. 2022. (Year: 2022).*

* cited by examiner

*Primary Examiner* — A. Dexter Tugbang
(74) *Attorney, Agent, or Firm* — Meunier Carlin & Curfman LLC

(57) ABSTRACT

A method of manufacturing a coil for a torque sensor includes: holding a bobbin with a jig, the bobbin being formed in a cylindrical shape and provided with first inclined grooves and second inclined grooves on a cylindrical outer peripheral surface of the bobbin, the first inclined grooves being inclined at a preset specified angle with respect to an axial direction of the cylindrical shape, and the second inclined grooves being inclined at the specified angle with respect to the axial direction in a direction opposite to the first inclined grooves; and rotating the bobbin while simultaneously supplying insulated wires from nozzles arranged to surround the bobbin, and driving the nozzles in a direction orthogonal to a rotation direction of the bobbin so as to wind the insulated wires around the bobbin along the first inclined grooves or the second inclined grooves.

12 Claims, 11 Drawing Sheets

METHOD OF MANUFACTURING COIL FOR TORQUE SENSOR

CROSS-REFERENCE TO RELATED APPLICATIONS

This application claims the benefit of Japanese Patent Application No. 2019-024397 filed on Feb. 14, 2019 with the Japan Patent Office, the entire disclosure of which is incorporated herein by reference.

BACKGROUND

The present disclosure relates to a method of manufacturing a coil for a torque sensor.

There is widely known a torque sensor that measures a torque applied to a rotation shaft having magnetostrictive properties. For example, Japanese Unexamined Patent Application Publication No. 2016-200552 proposes a technique of winding an insulated wire forming a coil around a bobbin when manufacturing a coil for a magnetostrictive torque sensor used in a torque sensor by alternately repeating (i) winding the insulated wire around the bobbin while rotating the bobbin one turn in a forward direction, and then (ii) winding the insulated wire around the bobbin while rotating the bobbin one turn in a reverse direction.

SUMMARY

In the aforementioned torque sensor, however, an amount of movement to rotate the bobbin in the reverse direction is large when manufacturing the coil for the magnetostrictive torque sensor. Therefore, if it is attempted to simultaneously wind multiple insulated wires around the bobbin, the insulated wires tend to be entangled with each other relatively easily.

One aspect of the present disclosure relates to improvement of workability of manufacturing a coil for a torque sensor.

One aspect of the present disclosure provides a method of manufacturing a coil for a torque sensor. The method comprises: holding a bobbin with a jig; rotating the bobbin while simultaneously supplying insulated wires from nozzles arranged to surround the bobbin; and driving the nozzles in a direction orthogonal to a rotation direction of the bobbin so as to wind the insulated wires around the bobbin along first inclined grooves or second inclined grooves. The bobbin is formed in a cylindrical shape and provided with the first inclined grooves and the second inclined grooves on its cylindrical outer peripheral surface. The first inclined grooves are inclined at a preset specified angle with respect to an axial direction of the cylindrical shape, and the second inclined grooves are inclined at the specified angle with respect to the axial direction in a direction opposite to the first inclined groove.

According to the method as above, the insulated wires are continuously wound around the bobbin along the first inclined grooves or the second inclined grooves. Therefore, it is only necessary to drive the nozzles in a direction orthogonal to the rotation direction of the bobbin, and there is no need to drive the nozzles in the rotation direction of the bobbin. As a result, the nozzles can be less likely to hit each other, and therefore it is possible to simultaneously wind multiple insulated wires around the bobbin. Thus, a speed of winding the insulated wires around the bobbin can be improved, or workability of manufacturing a coil for a magnetostrictive torque sensor can be improved.

Another aspect of the present disclosure may provide a coil for a magnetostrictive torque sensor used as a torque sensor for measuring a torque applied to a rotation shaft having magnetostrictive properties. The coil may comprise a bobbin, a first detection coil, and a second detection coil.

The bobbin is non-metallic, and is provided coaxially with and apart from the rotation shaft having magnetostrictive properties. The bobbin is formed into a hollow cylindrical shape and is provided with first inclined grooves and second inclined grooves on an outer peripheral surface of the bobbin. The first inclined grooves are inclined at a preset specified angle with respect to an axial direction of the cylindrical shape, and the second inclined grooves are inclined at the specified angle with respect to the axial direction in a direction opposite to the first inclined grooves.

The first detection coil is configured with a first wire, which is an insulated wire wound around the bobbin and is arranged along the first inclined grooves in the order of one rotation direction of the bobbin. The second detection coil is configured with a second wire, which is another insulated wire wound around the bobbin and is arranged along the second inclined grooves in the order of the one rotation direction of the bobbin. The first wire is arranged to run through the first inclined grooves longitudinally and transversely, and the second wire is arranged to run through the second inclined grooves longitudinally and transversely.

The configuration as above can be obtained by winding the first wire and the second wire around the bobbin while continuously rotating the bobbin generally in one direction without largely reversing the bobbin when manufacturing the first detection coil and the second detection coil. Therefore, the configuration as such allows simultaneously winding multiple insulated wires around the bobbin while suppressing entanglement of the multiple insulated wires. As a result, workability of manufacturing a coil for a magnetostrictive torque sensor can be improved.

BRIEF DESCRIPTION OF THE DRAWINGS

Exemplary embodiments of the present disclosure will be described hereinafter with reference to the accompanying drawings, in which.

DETAILED DESCRIPTION OF EXEMPLARY EMBODIMENTS

[1-1. Overall Configuration of Torque Sensor]

Figure 1:
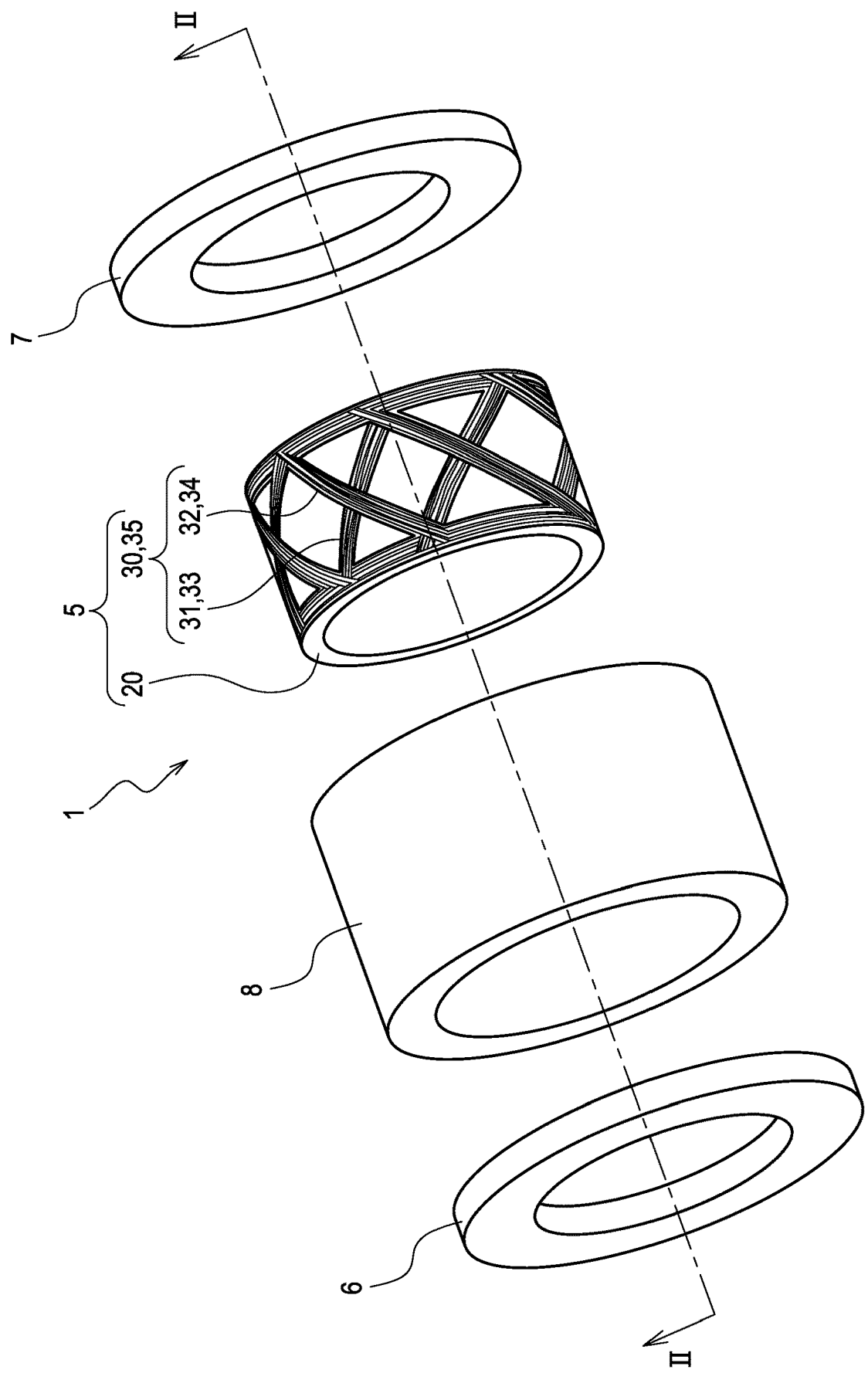
FIG. 1 is an exploded perspective view of a torque sensor.
Figure 2:
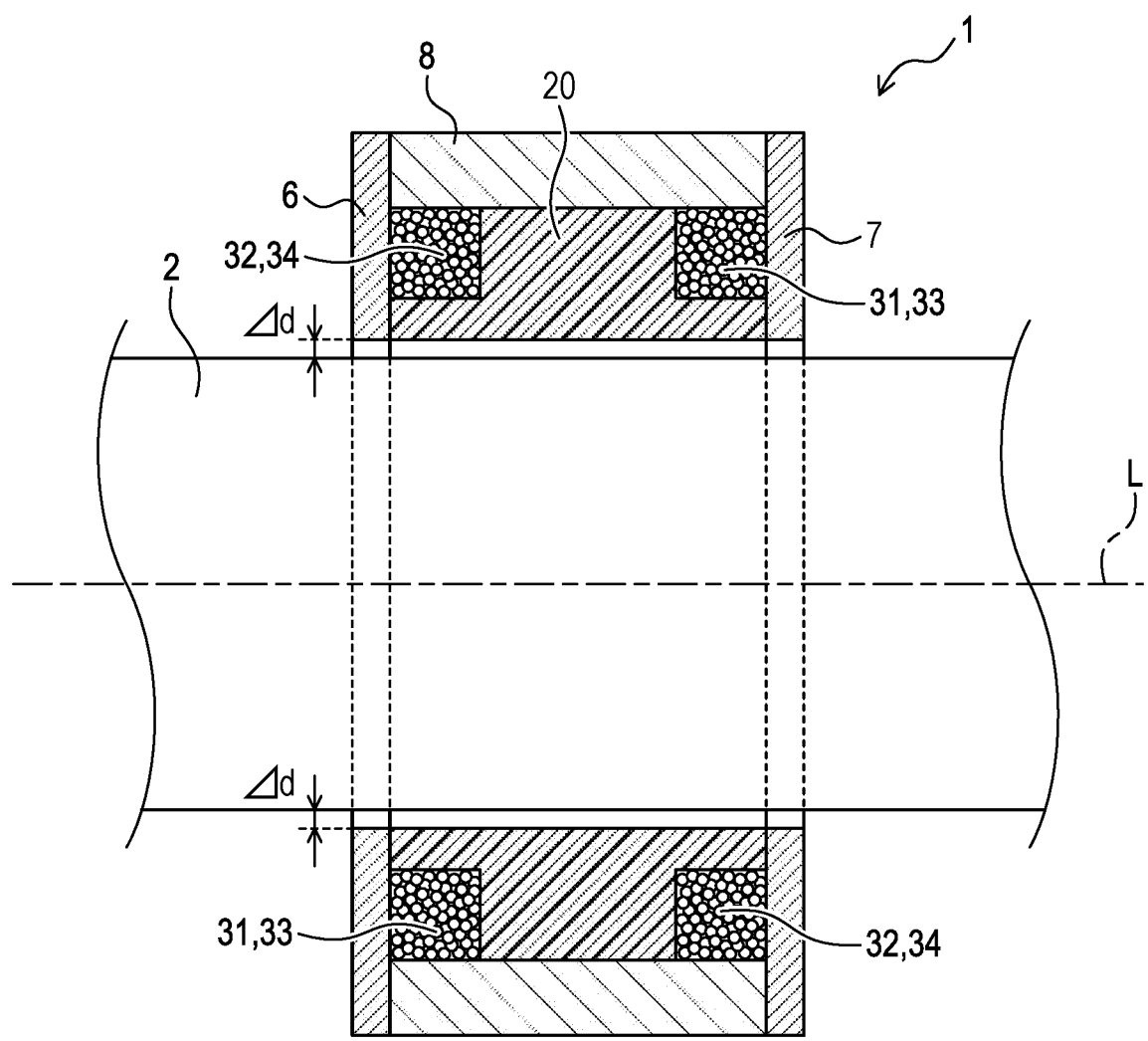
FIG. 2 is a sectional view of the torque sensor attached to a rotation shaft.

FIG. 1 is an exploded perspective view of a torque sensor 1 in one aspect of the present disclosure. FIG. 2 is a sectional view of the torque sensor 1 attached to a rotation shaft 2.

As shown in FIGS. 1 and 2, the torque sensor 1 is a magnetostrictive sensor attached around the rotation shaft 2 having magnetostrictive properties for measuring a rotation torque applied to the rotation shaft 2 mounted on a vehicle.

The torque sensor 1 comprises a magnetostrictive torque sensor coil 5, shields 6, 7, and a magnetic ring 8. The magnetostrictive torque sensor coil 5 comprises a bobbin 20 made of a resin, and a first detection coil 30 and a second detection coil 35 (hereinafter, also referred to as "detection coils 30, 35") configured by winding insulated wires 31, 32, 33, 34 (hereinafter, also referred to as "insulated wires 31 to 34") around the bobbin 20.

The rotation shaft 2 is made of a material having magnetostrictive properties, and is formed in a columnar shape, or a rod-like shape. Examples of the material having magnetostrictive properties include nickel, an iron-aluminum alloy, an iron-cobalt alloy and the like.

The material used for the rotation shaft 2 may be either a positive magnetostrictive material, of which magnetic permeability decreases under compression and increases under tension, or a negative magnetostrictive material, of which magnetic permeability increases under compression and decreases under tension. As the rotation shaft 2, for example, a shaft for use in powertrain torque transmission, a shaft for use in torque transmission of a vehicle engine and the like may be employed.

The magnetic ring 8 comprises a magnetic body, for example, a ferromagnetic body, and is formed into a hollow cylindrical shape. The bobbin 20 provided with the detection coils 30, 35 is inserted to a hollow part of the magnetic ring 8, and the magnetic ring 8 is arranged to cover an outer peripheral surface of the bobbin 20.

An internal diameter of the magnetic ring 8 is generally the same as an external diameter of the bobbin 20, and is made slightly larger than the external diameter of the bobbin 20. The magnetic ring 8 serves to suppress decrease in sensitivity due to leakage of magnetic flux generated in the detection coils 30, 35 to an exterior.

The shields 6, 7 have a function of fixing the bobbin 20 to the magnetic ring 8, and a function to protect the detection coils 30, 35 from external electromagnetic noises (or to block electromagnetic noises). The shields 6, 7 are each formed in a ring shape having an external diameter generally consistent with an external diameter of the magnetic ring 8, and with an internal diameter generally consistent with an internal diameter of the bobbin 20.

The bobbin 20 is inserted to the hollow part of the magnetic ring 8. The shields 6, 7 are arranged on both sides of the bobbin 20 in an axial direction L of the rotation shaft 2. In other words, the bobbin 20 is interposed between the shields 6, 7 and is fixed to the magnetic ring 8.

The torque sensor 1 has a gap between an inner wall of the bobbin 20 and the rotation shaft 2. The gap avoids contact between the torque sensor 1 and the rotation shaft 2. Further, the torque sensor 1 is fixed to a fixing member such as a housing. This prevents the torque sensor 1 from rotating with rotation of the rotation shaft 2.

[1-2. Configuration of Bobbin 20 and Detection Coils 30, 35]

Figure 3:
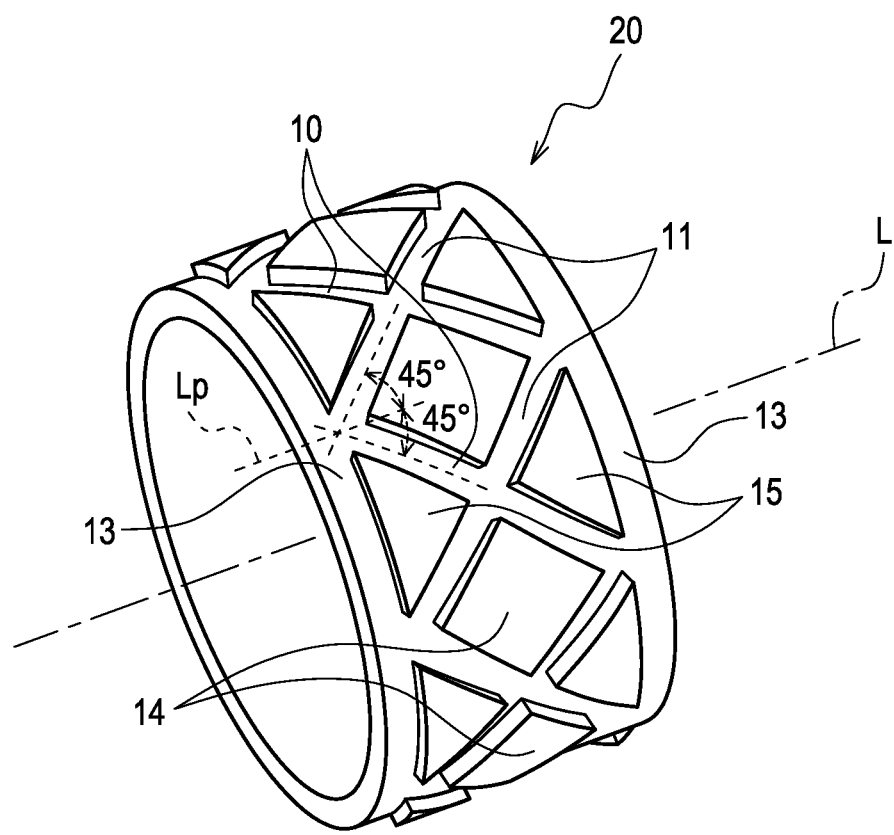
FIG. 3 is a perspective view of a bobbin.

As shown in FIGS. 1 to 3, the bobbin 20 is made of a resin and is formed into a hollow cylindrical shape as a whole. The bobbin 20 is provided apart from the rotation shaft 2 by a specified distance Δd, and is coaxial with the rotation shaft 2.

First inclined grooves 10 and second inclined grooves 11 are formed on an outer peripheral surface of the bobbin 20. The first inclined grooves 10 are inclined at a preset specified angle with respect to the axial direction L of the rotation shaft 2. The second inclined grooves 11 are inclined at the specified angle with respect to the axial direction L in a direction opposite to the first inclined grooves 10. The angle of the first inclined grooves 10 with respect to the axial direction L is set to be the same as the angle of the second inclined grooves 11 with respect to the axial direction L.

In the present embodiment, as shown in FIG. 3, the first inclined grooves 10 are formed to be inclined at +45 degrees with respect to the axial direction L, and the second inclined grooves 11 are formed to be inclined at −45 degrees with respect to the axial direction L. FIG. 3 shows that the first inclined grooves 10 and the second inclined grooves 11 are inclined by 45 degrees with respect to a straight line Lp that is parallel to the axial direction L.

In the torque sensor 1, the detection coils 30, 35 are formed by winding the insulated wires 31 to 34 along the first inclined grooves 10 and the second inclined grooves 11 (hereinafter, also referred to as "inclined grooves 10, 11"). Change in magnetic permeability when a torque is applied to the rotation shaft 2 is largest in directions of ±45 degrees with respect to the axial direction L. Therefore, detection sensitivity of the torque sensor 1 can be improved by setting the inclinations of the inclined grooves 10, 11 with respect to the axial direction L to ±45 degrees respectively.

The inclinations of the inclined grooves 10, 11 are not limited to ±45 degrees. Too small or too large inclinations of the inclined grooves 10, 11, however, can decrease sensitivity. Therefore, it is desirable that inclinations of the inclined grooves 10, 11 are within ranges of ±30 to 60 degrees.

On the outer peripheral surface of the bobbin 20 of the present embodiment, an even number of the first inclined grooves 10 and an even number of the second inclined grooves 11 are alternately formed at equal intervals in a circumferential direction of the rotation shaft 2 orthogonal to the axial direction L. In the present embodiment, six first inclined grooves 10 and six second inclined grooves 11 are formed for every 60 degrees respectively in the circumferential direction of the rotation shaft 2.

Further, on the outer peripheral surface of the bobbin 20, side passages 13 are formed along both opposite sides of the bobbin 20. The sides of the bobbin 20 indicate side surfaces in the axial direction L, in other words, side surfaces adjacent to the shields 6, 7.

On the outer peripheral surface of the bobbin 20, there are diamond projections 14 having a diamond-shape, triangular projections 15 having an isosceles triangular shape, the inclined grooves 10, 11 that serve as valleys between the diamond projections 14 and the triangular projections 15 (hereinafter, also referred to as "projections 14, 15"), and the side passages 13, as a whole. The number of each of the inclined grooves 10, 11 is not limited to six as described in the present embodiment, and can be changed as appropriate depending on the external diameter of the bobbin 20, the external diameter of the rotation shaft 2 and the like.

In the present embodiment, the detection coils 30, 35 are formed on the outer peripheral surface of the bobbin 20. Therefore, it is preferable to use the bobbin 20 made of a material such as a resin which has a less effect on a magnetic flux generated in the detection coils 30, 35 than a metallic material. The material of the bobbin 20 is not limited to the resin, and may be a non-metal that has a less effect on a magnetic flux than a metal.

When the torque sensor 1 is used in an environment where oil such as a lubricant may contact the torque sensor 1, it is preferable to make the bobbin 20 from a material having an oil resistance. When the torque sensor 1 is used in a high temperature environment, it is preferable to make the bobbin 20 from a material having a heat resistance.

Further, it is desirable to make the bobbin 20 from a material having a linear expansion coefficient similar to that of copper or a copper alloy which is generally employed as a material for the insulated wires 31 to 34. More specifically, as the resin for use in forming the bobbin 20, it is preferable to use a material of which linear expansion coefficient is within ±25% of the linear expansion coefficient of copper or a copper alloy. This reduces a difference between a deformation amount of the bobbin 20 and a deformation amount of the insulated wires 31 to 34 due to temperature change, and suppresses breakage of the insulated wires 31 to 34.

In the present embodiment, the detection coils 30, 35 are configured by stacking four layers, each of which is formed from each one of the insulated wires 31 to 34. The first detection coil 30 comprises the insulated wire 31 which forms a first layer of the four layers, and the insulated wire 33 which forms a third layer of the four layers. The second detection coil 35 comprises the insulated wire 32 which forms a second layer of the four layers, and the insulated wire 34 which forms a fourth layer of the four layers.

The first detection coil 30 is configured by winding the insulated wires (first wires) 31, 33 around the bobbin 20 along the first inclined grooves 10, a one-side passage 13A, and an other-side passage 13B. FIGS. 4 to 6 and 8 are developed views of the bobbin 20.

Figure 4:
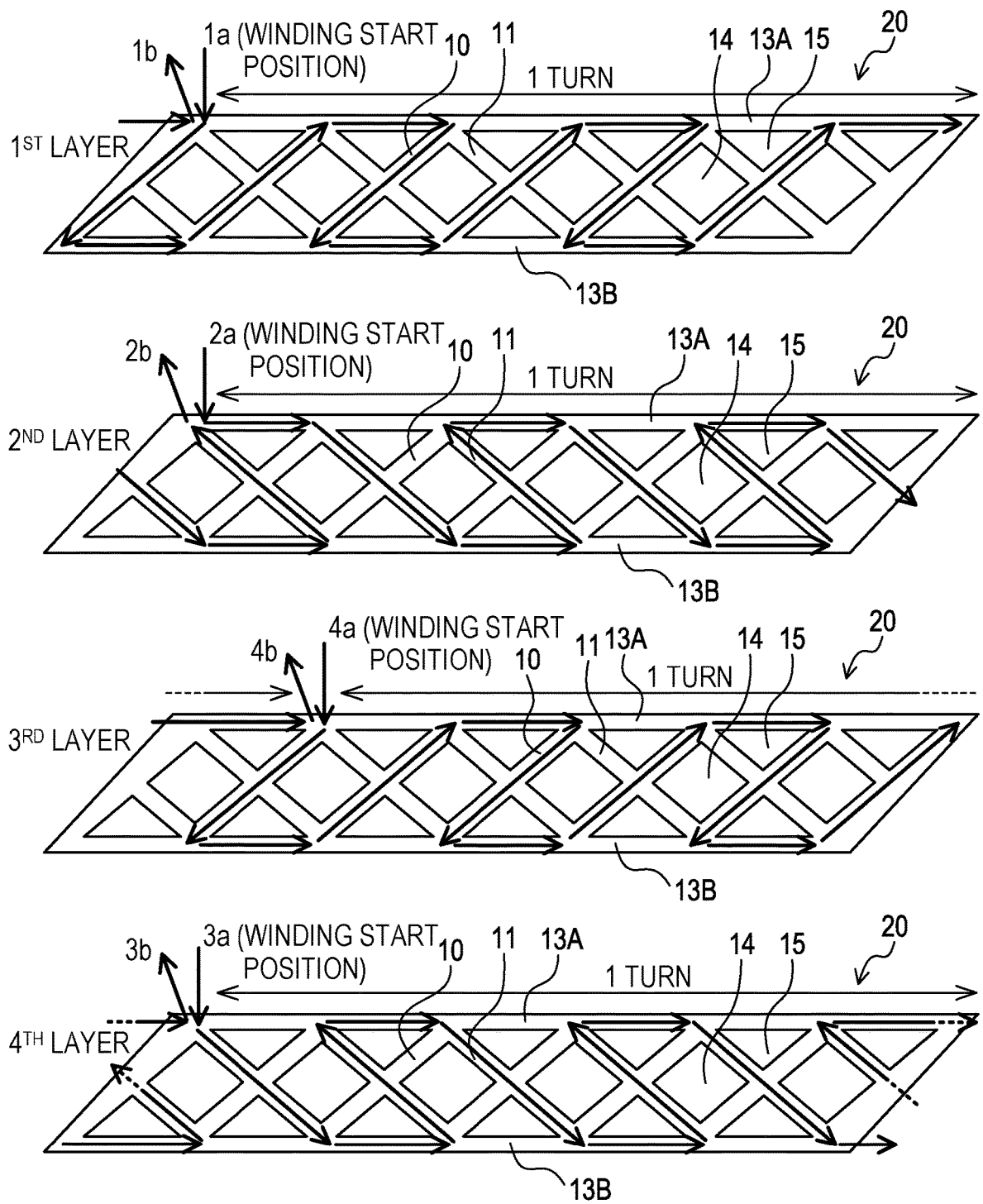
FIG. 4 is a developed view of the bobbin showing a way of winding an insulated wire in each layer.

As shown in FIG. 4, in forming the first layer of the first detection coil 30, the insulated wire 31 is first arranged along the first inclined groove 10 from a winding start position 1a toward the other-side passage 13B. The winding start position 1a is a position in the one-side passage 13A that corresponds to an end of the specified first inclined groove 10. Then, the insulated wire 31 is arranged along the side passage 13B toward the adjacent first inclined groove 10 (first inclined groove 10 on the right in FIG. 4). Then, the insulated wire 31 is arranged along the adjacent first inclined groove 10 from the other-side passage 13B to the one-side passage 13A. Then, the insulated wire 31 is arranged along the side passage 13A toward the further adjacent first inclined groove 10 (first inclined groove 10 further on the right in FIG. 4). Hereinafter, the insulated wire 31 is repeatedly arranged along the first inclined grooves 10, the one-side passage 13A, and the other-side passage 13B. The insulated wire 31 is wound on an outer periphery of the bobbin 20 by a specified number of turns. A winding end position 1b of the insulated wire 31 can be exemplified as the same position as the winding start position 1a. The insulated wire 31 is wired substantially in a crank-shape, that is, a zigzag, in which the insulated wire 31 goes back and forth between the one-side passage 13A and the other-side passage 13B through the first inclined grooves 10.

The third layer of the first detection coil 30, like the first layer, is formed by moving the insulated wire 33 back and forth between the one-side passage 13A and the other-side passage 13B through the first inclined grooves 10. Specifically, the insulated wire 33 is first arranged along the first inclined groove 10 from a winding start position 4a toward the other-side passage 13B. A procedure of arranging the insulated wire 33 hereinafter is the same as that in the first layer. A winding end position 4b of the insulated wire 33 can be exemplified as the same position as the winding start position 4a. The winding start position 4a is a position in the one-side passage 13A that corresponds to an end of the first inclined groove 10 adjacent to the winding start position 1a (specified first inclined groove 10).

Figure 5:
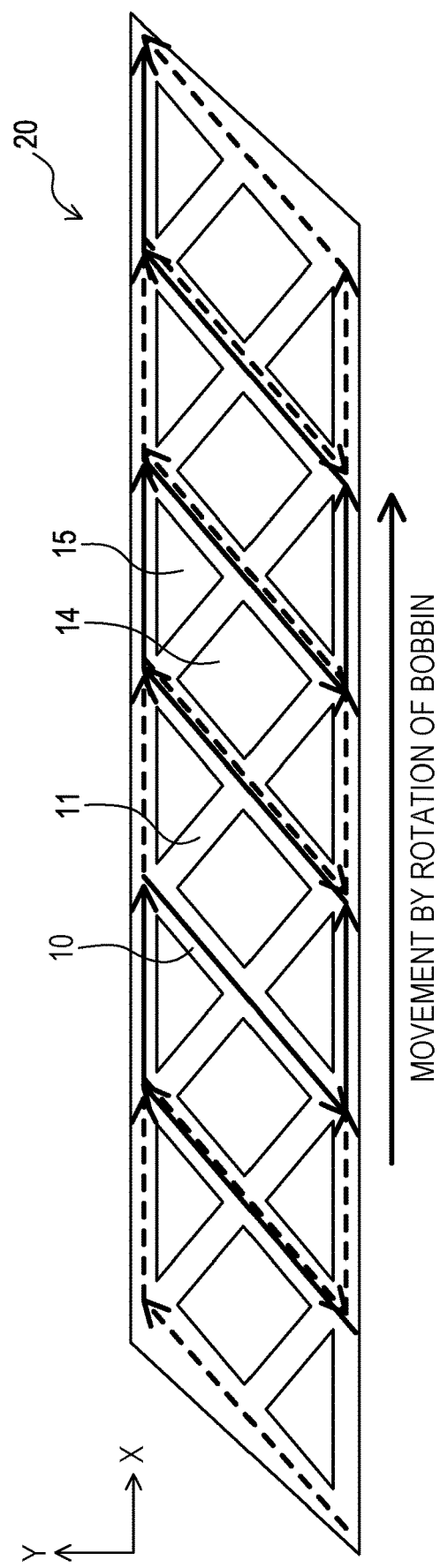
FIG. 5 is a developed view of the bobbin showing a way of winding the insulated wires in a first layer and a third layer.

In the first layer of the first detection coil 30, as shown by a solid line in FIG. 5, the insulated wire 31 is arranged on three sides (adjacent first inclined grooves 10, and one of the side passage 13A and the side passage 13B) out of four sides that form a parallelogram surrounded by the adjacent first inclined grooves 10, the one-side passage 13A, and the other-side passage 13B. In the third layer of the first detection coil 30, as shown by a broken line in FIG. 5, the insulated wire 33 is arranged on three sides (adjacent first inclined grooves 10, and the other of the side passage 13A and the side passage 13B) out of four sides that form the parallelogram (the same parallelogram as that in the first layer) surrounded by the adjacent first inclined grooves 10 and the one-side passage 13A and the other-side passage 13B.

That is, one or both of the insulated wire 31 of the first layer and the insulated wire 33 of the third layer are arranged on the four sides (adjacent first inclined grooves 10, the one-side passage 13A, and the other-side passage 13B) forming the aforementioned parallelogram. In other words, the aforementioned parallelogram is formed by a combination of the insulated wire 31 of the first layer and the insulated wire 33 of the third layer.

The second detection coil 35 is configured by winding the insulated wires (second wires) 32, 34 around the bobbin 20 along the second inclined grooves 11, the one-side passage 13A, and the other-side passage 13B. As shown in FIG. 4, in forming the second layer of the second detection coil 35, the insulated wire 32 is first arranged along the one-side passage 13A from a winding start position 2a toward the adjacent second inclined groove 11 (second inclined groove 11 on the right in FIG. 4). The winding start position 2a is a position in the one-side passage 13A that corresponds to an end of the specified second inclined groove 11.

Then, the insulated wire 32 is arranged along the adjacent second inclined groove 11 from the one-side passage 13A toward the other-side passage 13B. Then, the insulated wire 32 is arranged along the other-side passage 13B from the adjacent second inclined groove 11 toward the further adjacent second inclined groove 11. Then, the insulated wire 32 is arranged along the further adjacent second inclined groove 11 from the other-side passage 13B toward the one-side passage 13A.

Hereinafter, the insulated wire 32 is repeatedly arranged along the second inclined grooves 11, the one-side passage 13A, and the other-side passage 13B. The insulated wire 32 is wound on the outer periphery of the bobbin 20 by a specified number of turns. A winding end position 2b of the insulated wire 32 can be exemplified as the same position as the winding start position 2a. The insulated wire 32 is wired substantially in a crank-shape, that is, a zigzag, in which the insulated wire 32 goes back and forth between the one-side passage 13A and the other-side passage 13B through the second inclined grooves 11.

The fourth layer of the second detection coil 35, like the second layer, is formed by moving the insulated wire 34 back and forth between the one-side passage 13A and the other-side passage 13B through the second inclined grooves 11. Specifically, the insulated wire 34 is first arranged along the second inclined groove 11 from a winding start position 3*a* toward the other-side passage 13B. A procedure of arranging the insulated wire 34 hereinafter is the same as that in the second layer. A winding end position 3*b* of the insulated wire 34 can be exemplified as the same position as the winding start position 3*a*.

The winding start position 3*a* is the same position as the winding start position 2*a*. Similar to the insulated wire 31 of the first layer and the insulated wire 33 of the third layer, one or both of the insulated wire 32 of the second layer and the insulated wire 34 of the fourth layer are arranged on four sides of a parallelogram configured by the adjacent second inclined grooves 11, the one-side passage 13A, and the other-side passage 13B. In other words, the aforementioned parallelogram is formed by a combination of the insulated wire 32 of the second layer and the insulated wire 34 of the fourth layer.

The detection coils 30, 35 of the present embodiment can be formed generally by rotating the bobbin 20 in one direction along an X-axis direction in FIGS. 5 and 6 and moving later-described nozzles 54, which supply the insulated wires 31 to 34, in a Y-axis direction. In other words, it is not necessary to move the nozzles 54 in the X-axis direction. The X-axis direction is a circumferential direction of the bobbin 20, and the Y-axis direction is the axial direction L.

Figure 6:
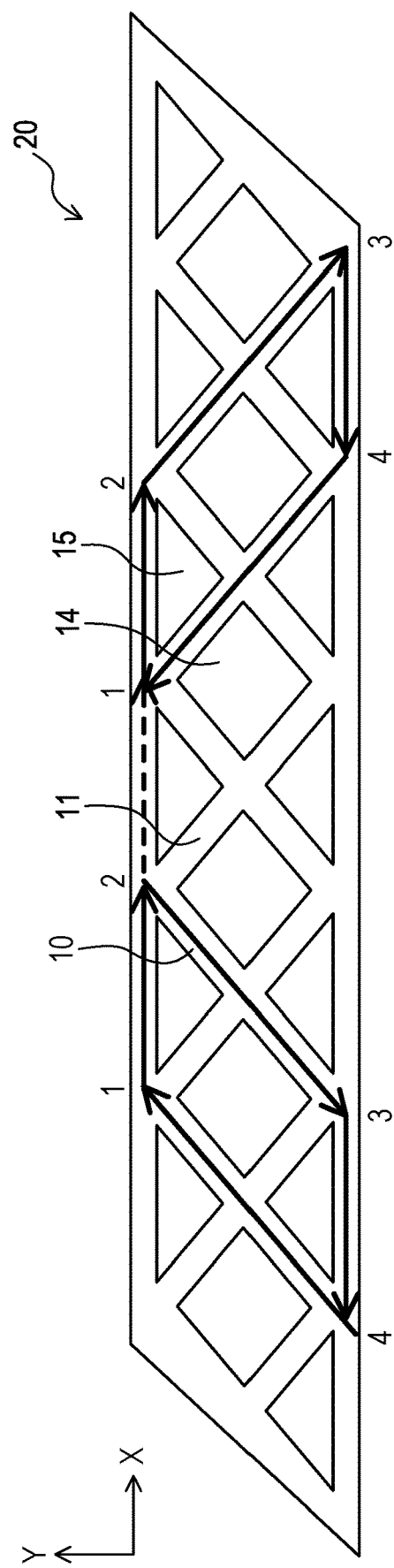
FIG. 6 is a developed view of the bobbin showing a way of winding insulated wires in a reference example.

In a reference example method as shown FIG. 6, one insulated wire is arranged to pass through all the sides of the aforementioned parallelogram. When the insulated wire is arranged as such, it is necessary to largely rotate the bobbin 20 not only in one direction but also in the other direction which means a reverse rotation. Alternatively, it is necessary to move the nozzles not only in the Y-axis direction but also in the X-axis direction.

Figure 7:
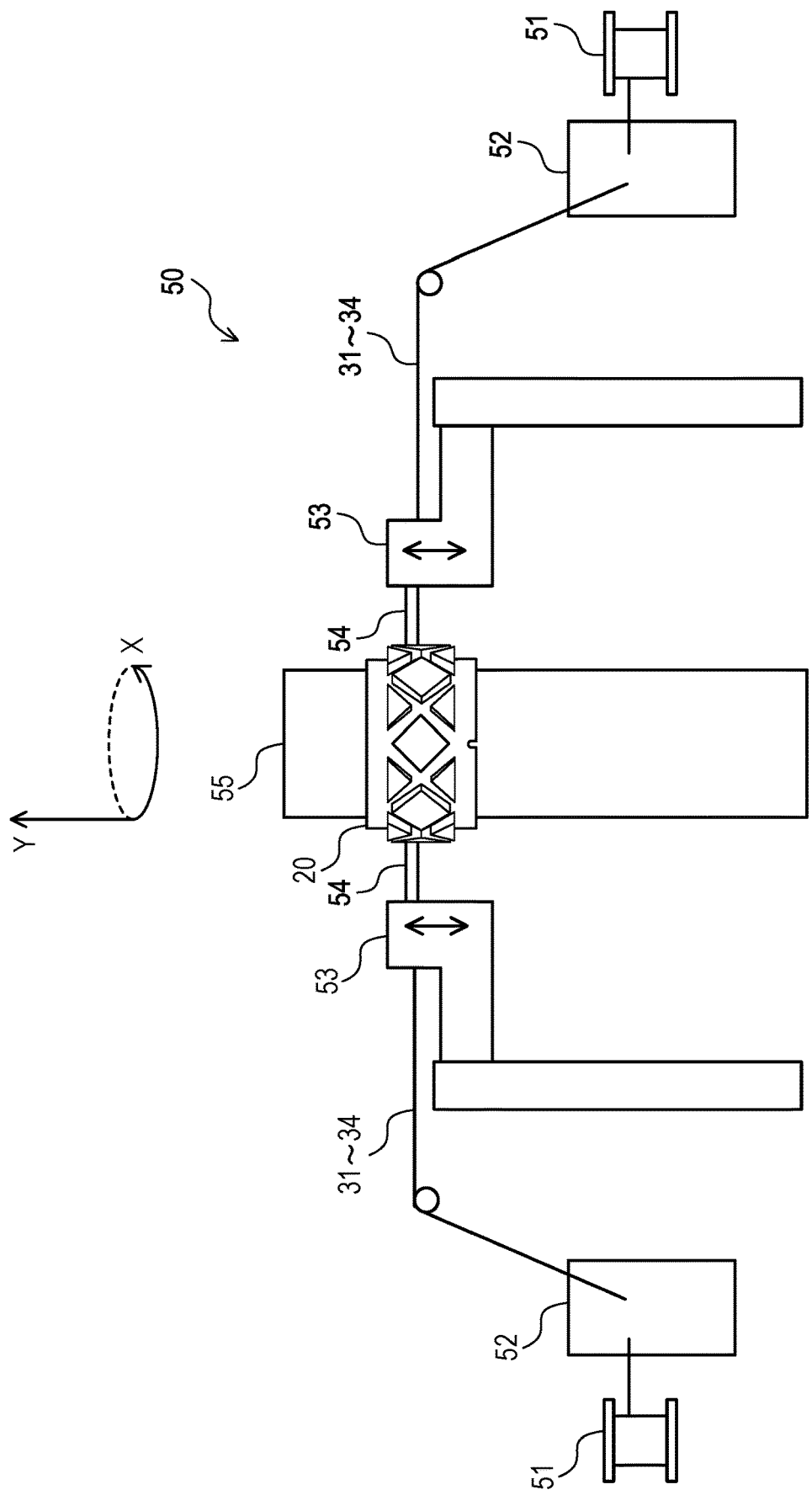
FIG. 7 is schematic diagram of a coil manufacturing device.

In the method of the present embodiment, the insulated wires 31 to 34 are wound around the bobbin 20 using, for example, a coil manufacturing device 50 as shown in FIG. 7.

As shown in FIG. 7, the coil manufacturing device 50 comprises supply bobbins 51, tensioners 52, movable holders 53 and the nozzles 54. The coil manufacturing device 50 comprises a rotation jig 55. Four supply bobbins 51, four tensioners 52, four movable holders 53, and four nozzles 54 are provided, and two of each of them are shown in FIG. 7.

The insulated wires 31 to 34 supplied to the bobbin 20 to become the detection coils 30, 35 are wound around the supply bobbins 51. The insulated wires 31 to 34 are continuously sent to the tensioners 52.

The tensioners 52 supply the insulated wires 31 to 34 toward the bobbin 20 while holding the insulated wires 31 to 34 such that tension of the insulated wires 31 to 34 to be wound around the bobbin 20 is generally constant. The movable holders 53 comprise the nozzles 54, and are configured to be movable in the Y-axis direction together with the nozzles 54. The Y-axis direction in FIG. 7 is an up and down direction of the sheet of the drawing. The movable holder 53 may be movable in the X-axis direction.

The nozzles 54 supply the insulated wires 31 to 34, which are sent from the tensioners 52, to the bobbin 20 through ends of the nozzles 54.

The rotation jig 55 is arranged to penetrate through an inside of the bobbin 20 and holds the bobbin 20 from the inside of the bobbin 20. The rotation jig 55 is rotated by an actuator such as a motor, and also the bobbin 20 rotates with the rotation of the rotation jig 55. When the rotation jig 55 rotates in a state where leading ends of the insulated wires 31 to 34 are held by the bobbin 20, tension is applied to the insulated wires 31 to 34, and the insulated wires 31 to 34 are supplied from the tensioners 52 to the bobbin 20.

In order to optimize positions of the nozzles 54 in the Y-axis direction as positions to wind the insulated wires 31 to 34, positions of the movable holders 53 in the Y-axis direction are controlled in synchronization with rotation of the rotation jig 55.

In the reference example method, in simultaneously winding multiple insulated wires, nozzles (not shown) that supply the insulated wires move not only in the Y-axis direction but also in the X-axis direction. Therefore, the nozzles may come into contact with each other. As a result, the number of insulated wires that can be simultaneously wound is limited. In the method of the present embodiment, there is no need to move the nozzles 54 in the X-axis direction. Therefore, simultaneously winding multiple insulated wires around the bobbin 20 is facilitated as compared to the reference example method.

In the method of the present embodiment, there is no need to reverse the bobbin 20 when winding the insulated wires along the side passages 13. In other words, a rotation amount to reverse the bobbin 20 can be reduced to the minimum (amount to wind the insulated wires along the inclined grooves 10, 11). Therefore, as compared to the reference example method, the method of the present embodiment allows simultaneously winding multiple insulated wires around the bobbin 20. In addition, a speed of winding the insulated wires 31 to 34 around the bobbin 20 can be improved.

Figure 8:
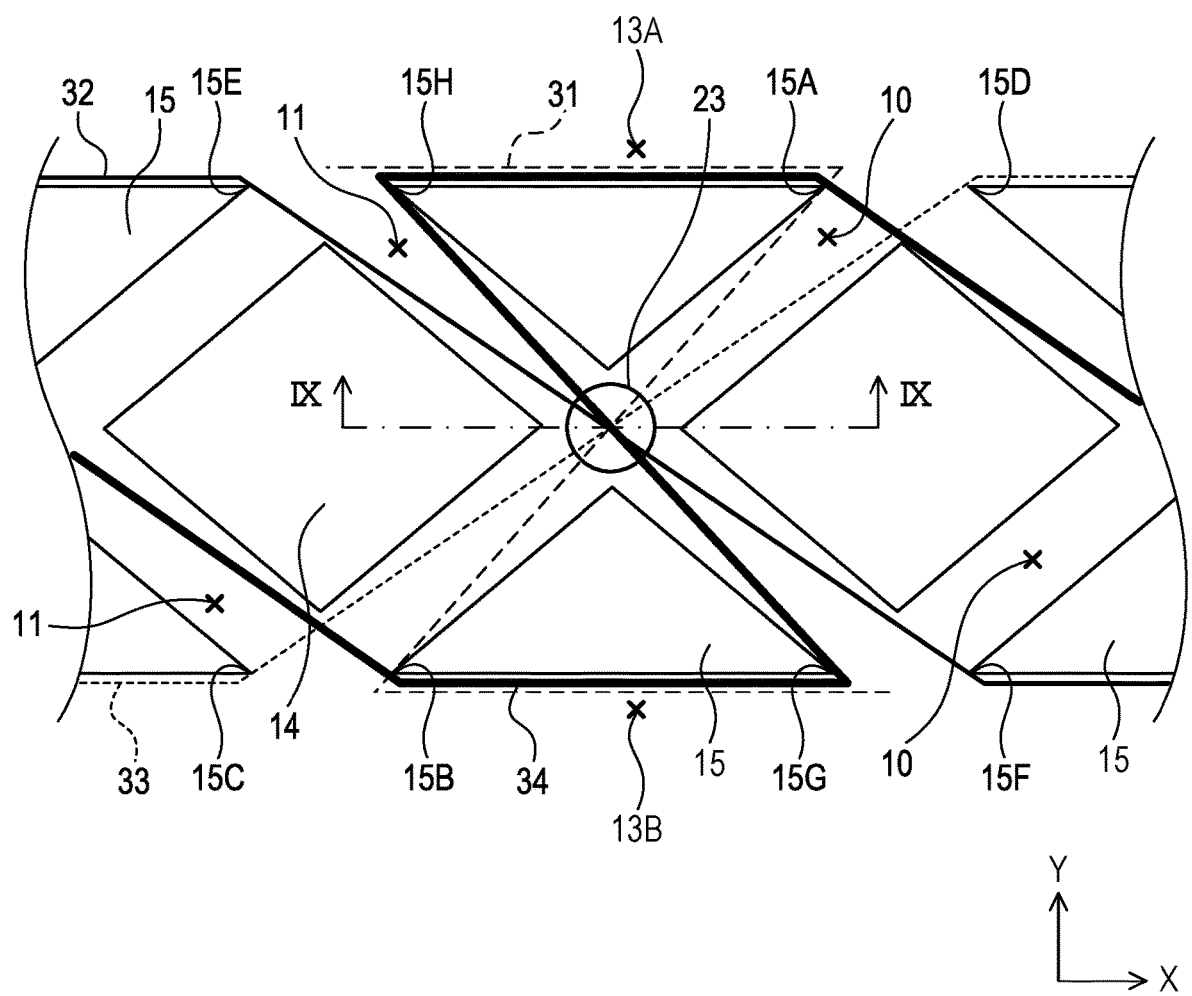
FIG. 8 is a partially enlarged view of the bobbin in the developed view.

When the insulated wires 31 to 34 are wound around the bobbin 20 according to the method of the present embodiment, the insulated wires 31, 33 are arranged to diagonally traverse all of the first inclined grooves 10, as shown in FIG. 8. Also, the insulated wires 32, 34 are arranged to diagonally traverse all of the second inclined grooves 11.

That is, the insulated wire 31 is wound around a corner 15A arranged on the one-side passage 13A side and around a corner 15B arranged on the other-side passage 13B in the first inclined groove 10, whereby the insulated wire 31 changes directions and is arranged. In other words, the insulated wire 31 is arranged to run through an area of the first inclined grooves 10 longitudinally and transversely, from the corner 15A toward the corner 15B, or from the corner 15B toward the corner 15A.

The corner 15A is a corner on the X-axis positive side of the triangular projection 15 facing the one-side passage 13A where the insulated wire 31 is arranged. The corner 15B is a corner on the X-axis negative side of the triangular projection 15 facing the other-side passage 13B where the insulated wire 31 is arranged.

The insulated wire 33 is wound around a corner 15D arranged on the one-side passage 13A side and around a corner 15C arranged on the other-side passage 13B side in the first inclined groove 10, whereby the insulated wire 33 changes directions and is arranged. In other words, the insulated wire 33 is arranged to run through the area of the first inclined grooves 10 longitudinally and transversely, from the corner 15C toward the corner 15D, or from the corner 15D toward the corner 15C.

The corner 15C is a corner on the X-axis positive side of the triangular projection 15 facing the other-side passage 13B where the insulated wire 33 is arranged. The corner 15D is a corner on the X-axis negative side of the triangular projection 15 facing the one-side passage 13A where the insulated wire 33 is arranged.

The insulated wire 32 is wound around a corner 15E arranged on the one-side passage 13A side and around a corner 15F arranged on the other-side passage 13B side in the second inclined groove 11, whereby the insulated wire 32 changes directions and is arranged. In other words, the insulated wire 32 is arranged to run through an area of the second inclined grooves 11 longitudinally and transversely, from the corner 15E toward the corner 15F, or from the corner 15F toward the corner 15E.

The insulated wire 34 is wound around a corner 15H arranged on the one-side passage 13A side and around a corner 15G arranged on the other-side passage 13B side in the second inclined groove 11, whereby the insulated wire 34 changes directions and is arranged. In other words, the insulated wire 34 is arranged to run through the area of the second inclined grooves 11 longitudinally and transversely, from the corner 15G toward the corner 15H, or from the corner 15H toward the corner 15G. The insulated wires 31 to 34 are arranged to intersect at intersections 23 where the first inclined grooves 10 and the second inclined grooves 11 intersect.

Figure 9:
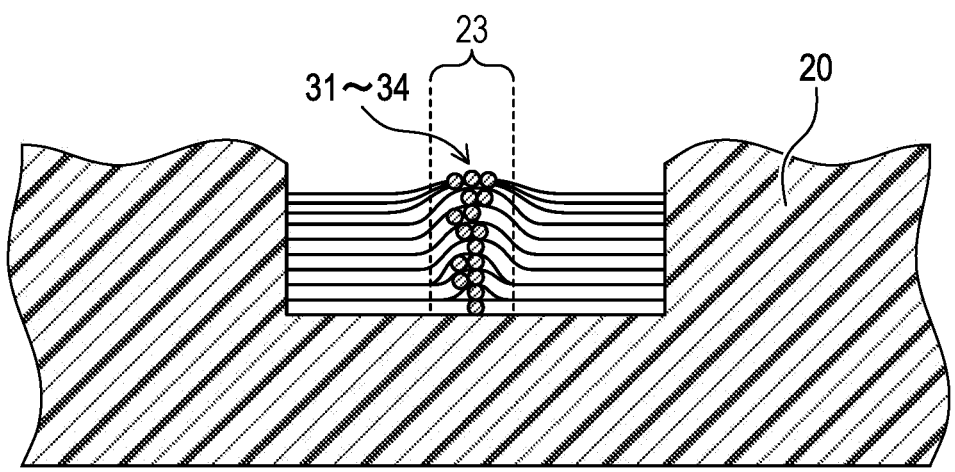
FIG. 9 is a sectional view showing a stacked state of the insulated wires in the bobbin.

As shown in FIG. 9, in a section of the intersection 23, all the insulated wires 31 to 34 that pass through the intersection 23 are stacked. Also, at the intersection 23, the insulated wires 31, 33 of the first detection coil 30 and the insulated wires 32, 34 of the second detection coil 35 are alternately stacked. All the insulated wires 31 to 34 may be stacked at the same position, or the insulated wires 31 to 34 may be stacked at positions generally close to each other.

The number of the insulated wires 31 to 34 stacked at the intersection 23 is a number obtained by multiplying the number of layers forming the detection coils 30, 35 by the number of turns in each layer. For example, when the number of turns of each of layers (four layers in total) configured by the insulated wires 31 to 34 is 30 turns, a product of the above multiplication, that is, 120 insulated wires, are stacked at the intersection 23. The same number of insulated wires may be stacked at all the intersections 23 or at positions generally close to the respective intersections 23.

The bobbin 20 is fixed to a jig when winding the insulated wires 31 to 34 around the bobbin 20. At that time, an end of the bobbin 20 in the axial direction L is locked to the jig to prevent rotation of the bobbin 20 due to the tension of the insulated wires 31 to 34.

The four nozzles 54 are arranged at every 90 degrees to surround the bobbin 20. While the insulated wires 31 to 34 are simultaneously supplied from the four nozzles 54, the bobbin 20 is rotated generally in one direction, and the nozzles 54 are driven in a direction orthogonal to the rotation direction of the bobbin 20. At that time, the nozzles 54 are repeatedly driven so that the insulated wires 31, 33 follow the first inclined grooves 10 in sequence and the insulated wires 32, 34 follow the second inclined grooves 11 in sequence. Thus, the four-layer detection coils 30, 35 are manufactured as described above.

The insulated wires 31 to 34 that form the respective layers (first layer to fourth layer) of the detection coils 30, 35 have generally the same length and are configured so that the layers have generally the same resistance value.

[1-3. Configuration of Measurement Section]

Figure 10:
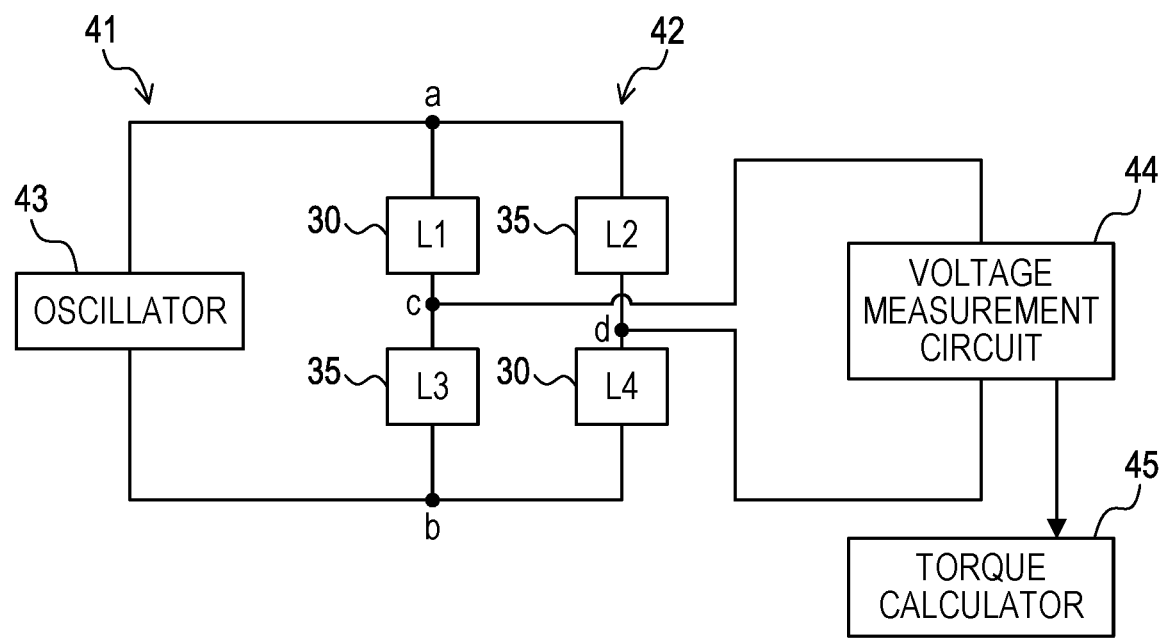
FIG. 10 is a block diagram of a measurement section.

As shown in FIG. 10, the torque sensor 1 includes a measurement section 41. The measurement section 41 detects change in inductances of the first detection coil 30 and the second detection coil 35 thereby to measure a torque applied to the rotation shaft 2. Hereinafter, an inductance of the first detection coil 30 in the first layer is indicated by L1, an inductance of the second detection coil 35 in the second layer is indicated by L2, an inductance of the first detection coil 30 in the third layer is indicated by L4, and an inductance of the second detection coil 35 in the fourth layer is indicated by L3.

The measurement section 41 comprises a bridge circuit 42, an oscillator 43, a voltage measurement circuit 44, and a torque calculator 45. The bridge circuit 42 is configured by sequentially coupling the detection coils 30, 35 of the first layer, the fourth layer, the third layer, and the second layer in series in a ring-shape.

The oscillator 43 applies an alternating current voltage between a contact a between the detection coils 30, 35 of the first layer and the second layer, and a contact b between the detection coils 30, 35 of the third layer and the fourth layer. The voltage measurement circuit 44 detects voltage between a contact c between the detection coils 30, 35 of the first layer and the fourth layer, and a contact d between the detection coils 30, 35 of the third layer and the second layer.

The torque calculator 45 calculates a torque applied to the rotation shaft 2 based on the voltage detected in the voltage measurement circuit 44. In the measurement section 41, the inductances L1 to L4 of the detection coils 30, 35 of the respective layers are the same and the voltage detected by the voltage measurement circuit 44 is almost zero when no torque is applied to the rotation shaft 2.

When a torque is applied to the rotation shaft 2, magnetic permeability in a direction of +45 with respect to the axial direction L decreases or increases, and magnetic permeability in a direction of −45 degrees with respect to the axial direction L increases or decreases. Accordingly, when a torque is applied to the rotation shaft 2 in a state where an alternating current voltage is applied by the oscillator 43, the inductance decreases or increases in the first detection coil 30 of the first and third layers, and the inductance increases or decreases in the second detection coil 35 of the second and fourth layers. As a result, the voltage detected by the voltage measurement circuit 44 changes, and the torque calculator 45 calculates the torque applied to the rotation shaft 2 based on the change in the voltage.

The detection coils 30, 35 of the respective layers have totally the same configuration except for the difference in the winding directions. Therefore, use of the bridge circuit 42 as shown in FIG. 10 can cancel an effect on the inductances of the detection coils 30, 35 due to temperature, and allows accurate detection of the torque applied to the rotation shaft 2. In the torque sensor 1, when the inductance increases or decreases in the first detection coil 30, the inductance inevitably decreases or increases in the second detection coil 35. Thus, use of the bridge circuit 42 as shown in FIG. 10 can improve detection sensitivity.

[1-4. Effects]

The embodiment detailed in the above produces following effects.

(1a) One aspect of the present disclosure provides a method of manufacturing the magnetostrictive torque sensor coil 5, the method comprising: holding the bobbin 20 with the jig; rotating the bobbin 20 while simultaneously supplying the insulated wires 31 to 34 from the nozzles 54 arranged to surround the bobbin 20, and driving the nozzles 54 in the direction orthogonal to the rotation direction of the bobbin 20 so as to wind the insulated wires 31 to 34 around the bobbin 20 along the first inclined grooves 10 or the second inclined grooves 11. The bobbin 20 is formed in a cylindrical shape. The bobbin 20 has the first inclined grooves 10 and the second inclined grooves 11 on the cylindrical outer peripheral surface. The first inclined grooves 10 are inclined at a preset specified angle with respect to the axial direction, and the second inclined grooves 11 are inclined at the preset specified angle with respect to the axial direction in the direction opposite to the first inclined grooves 10.

According to the method as above, the insulated wires are continuously wound around the bobbin along the first inclined grooves 10 or the second inclined grooves 11. Therefore, it is only necessary to drive the nozzles 54 in the direction orthogonal to the rotation direction of the bobbin 20, and there is no need to drive the nozzles 54 in the rotation direction of the bobbin 20. As a result, the nozzles 54 are less likely to hit each other, and thus, it is possible to simultaneously wind multiple insulated wires around the bobbin 20. Therefore, the speed of winding the insulated wires around the bobbin 20 can be improved. In other words, workability of manufacturing the magnetostrictive torque sensor coil 5 can be improved.

(1b) In the method of manufacturing the magnetostrictive torque sensor coil 5 of the present disclosure, the insulated wires 31 to 34 are simultaneously supplied from the four nozzles 54 arranged at every 90 degrees around the bobbin 20 to surround the bobbin 20 so that the four insulated wires 31 to 34 are simultaneously wound around the bobbin 20.

According to the method as above, since it is only necessary to drive the four nozzles 54 in the direction orthogonal to the rotation direction of the bobbin 20, the four nozzles 54 are less likely to hit each other. Accordingly, the four insulated wires 31 to 34 can be simultaneously wound around the bobbin 20.

(1c) One aspect of the present disclosure provides the magnetostrictive torque sensor coil 5 for use in the torque sensor 1 that measures a torque applied to the rotation shaft 2 having magnetostrictive properties. The magnetostrictive torque sensor coil 5 comprises the bobbin 20, the first detection coil 30, and the second detection coil 35.

The bobbin 20 is non-metallic and is provided coaxially with and apart from the rotation shaft 2 having magnetostrictive properties. The bobbin 20 is formed into a hollow cylindrical shape. On the outer peripheral surface of the bobbin 20, there are the first inclined grooves 10 inclined at the preset specified angle with respect to the axial direction L, and the second inclined grooves 11 inclined at the specified angle with respect to the axial direction L in the direction opposite to the first inclined grooves 10.

The first detection coil 30 is formed by winding the insulated wires 31, 33 around the bobbin 20 along the first inclined grooves 10. The second detection coil 35 is formed by winding the insulated wires 32, 34 around the bobbin 20 along the second inclined grooves 11. The insulated wires 31, 33 are wound around the bobbin 20 while diagonally traversing all the first inclined grooves 10, and the insulated wires 32, 34 are wound around the bobbin 20 while diagonally traversing all the second inclined grooves 11.

With the configuration as above, the first detection coil 30 and the second detection coil 35 can be obtained by winding the insulated wires 31, 33 and the insulated wires 32, 34 around the bobbin 20 while continuously rotating the bobbin 20 generally in one direction. In other words, the first detection coil 30 and the second detection coil 35 can be produced without rotating the bobbin 20 largely in the direction opposite to the aforementioned one direction. Accordingly, this configuration can inhibit entanglement of the insulated wires 31 to 34 when manufacturing the first detection coil 30 and the second detection coil 35, and allows simultaneously winding the insulated wires 31 to 34 around the bobbin 20. As a result, improvement of workability of manufacturing the magnetostrictive torque sensor coil 5 is facilitated.

Figure 11:
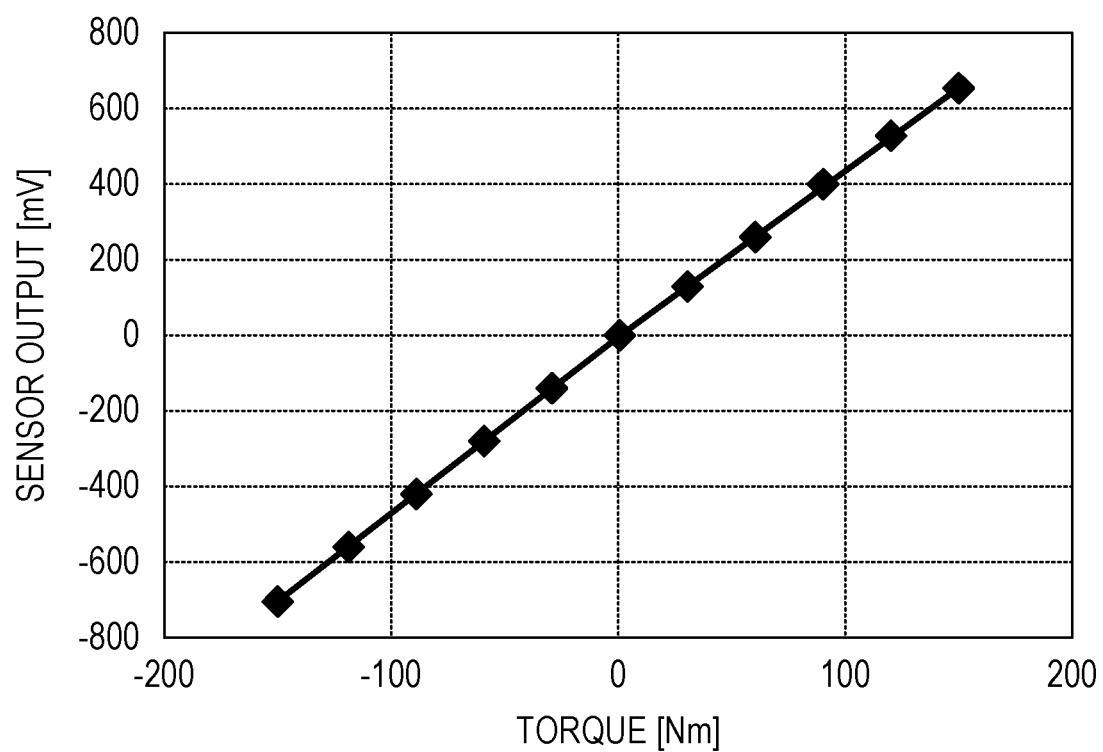
FIG. 11 is a graph showing a relationship between torque and sensor output.

(1d) Description is now made on a relationship between torque and sensor output in a detection coil (detection coil having an equivalent configuration to the first detection coil 30 and the second detection coil 35) obtained by winding a polyamideimide copper wire, which has a wire diameter of 0.1 mm, by 30 turns around the aforementioned bobbin 20. The relationship between torque and sensor output of the detection coil was measured by an experiment, and a relationship as shown in FIG. 11 was obtained. The sensor output was generally proportional to increase and decrease in torque. Sensor sensitivity was 4.54 mV/Nm, and a hysteresis error was 1.07% FS.

The hysteresis error indicates a relative reversibility error, or a difference between characteristic curves obtained when a load is increased and decreased respectively. It is preferable that the hysteresis error has a small value.

As a result of the above measurement, the detection coil of the present embodiment is considered to have almost the same good properties as the detection coil wound with insulated wires by the conventional method shown in FIG. 6. A relationship between torque and sensor output in the conventional detection coil was generally consistent with the result by the detection coil of the present embodiment shown in FIG. 11, and thus description thereof is omitted.

(1e) In one aspect of the present disclosure, the bobbin 20 may have the intersections 23 for the first inclined grooves 10 and the second inclined grooves 11. The intersections 23 indicate portions where the first inclined grooves 10 and the second inclined grooves 11 intersect at substantially center in the axial direction L of the rotation shaft 2. In the intersections 23, the insulated wires 31, 33 and the insulated wires 32, 34 may be sequentially stacked by the number of turns.

(1f) In one aspect of the present disclosure, the same numbers of the insulated wires 31, 33 and the insulated wires 32, 34 may be stacked in each of all the intersections 23.

With such configuration, it is possible to simultaneously wind the insulated wires 31, 33 and the insulated wire 32, 34 around the bobbin 20 while continuously rotating the bobbin 20 generally in one direction. Such configuration facilitates improvement of workability of manufacturing the magnetostrictive torque sensor coil 5.

(1g) In one aspect of the present disclosure, the first inclined grooves 10 may be formed to be inclined at +45 degrees with respect to the axial direction L. The second inclined grooves 11 may be formed to be inclined at −45 degrees with respect to the axial direction L.

With the configuration as above, the first detection coil 30 and the second detection coil 35 can easily detect stress generated by the twisting of the rotation shaft 2, as compared to a case in which the inclination angles are different from ±45 degrees.

2. Other Embodiments

The embodiments of present disclosure have been described in the above. The present disclosure is not limited to the aforementioned embodiments and can be implemented in various forms without departing from the gist of the present disclosure.

(2a) In the aforementioned embodiments, the magnetostrictive torque sensor coil 5 having the four layers of the coils is described, but the present disclosure is not limited to this. For example, a magnetostrictive torque sensor coil comprising multiple two layers of coils or having a multi-layer structure other than the four-layer structure may be manufactured.

(2b) Functions of one component in the aforementioned embodiments may be achieved by two or more components, and a function of one component may be achieved by two or more components. Functions of two or more components may be achieved by one component, and a function achieved by two or more components may be achieved by one component. A part of the aforementioned embodiments may be omitted. At least a part of the configuration of the aforementioned embodiment may be added to or may replace the configuration of the other embodiment. It should be noted that any and all modes that are encompassed in the technical ideas defined by the languages in the scope of the claims are embodiments of the present disclosure.

(2c) The present disclosure may be implemented in various modes in addition to the above-described method of manufacturing a magnetostrictive torque sensor coil. Such modes include a magnetostrictive torque sensor coil, a torque sensor comprising the magnetostrictive torque sensor coil, a system provided with the magnetostrictive torque sensor coil, and the like.

What is claimed is:

1. A method of manufacturing a coil for a torque sensor, the method comprising:
    holding a bobbin with a jig, the bobbin being formed in a cylindrical shape and provided with first inclined grooves and second inclined grooves on a cylindrical outer peripheral surface of the bobbin, a first side passage formed on the cylindrical outer peripheral surface on one side in an axial direction of the cylindrical shape, and a second side passage formed on the cylindrical outer peripheral surface on the other side opposite to the one side in the axial direction of the cylindrical shape, the first inclined grooves being inclined at a preset specified angle with respect to the axial direction of the cylindrical shape, and the second inclined grooves being inclined at the specified angle with respect to the axial direction in a direction opposite to the first inclined grooves; and
    rotating the bobbin while simultaneously supplying insulated wires from nozzles arranged to surround the bobbin, and driving the nozzles in a direction orthogonal to a rotation direction of the bobbin so as to wind the insulated wires around the bobbin along the first inclined grooves or the second inclined grooves,
    wherein when the insulated wires are wound around the bobbin so as to form one parallelogram along two adjacent first inclined grooves, a part of the first side passage, and a part of the second side passage, the insulated wires are wound around the bobbin along the first side passage and the second side passage in a same direction, and
    wherein when the insulated wires are wound around the bobbin so as to form one parallelogram along two adjacent second inclined grooves, a part of the first side passage, and a part of the second side passage, the insulated wires are wound along the first side passage and the second side passage in the same direction.

2. The method according to claim 1,
    wherein the bobbin has intersections for the first inclined grooves and the second inclined grooves, the intersections indicating portions where the first inclined grooves and the second inclined grooves intersect at substantially center of the bobbin in the axial direction, and
    wherein the method further comprises sequentially stacking first wires and second wires at the intersections, the first wires being the insulated wires to be arranged along the first inclined grooves, and the second wires being the insulated wires to be arranged along the second inclined grooves.

3. The method according to claim 2, further comprising: stacking the same number of the first wires and the second wires at the intersections.

4. The method according to claim 1,
    wherein the first inclined grooves are formed to be inclined at +45 degrees with respect to the axial direction, and
    wherein the second inclined grooves are formed to be inclined at −45 degrees with respect to the axial direction.

5. The method according claim 1, further including using four nozzles, as the nozzles, arranged at every 90 degrees to surround the bobbin.

6. The method according to claim 1, wherein the nozzles are spaced apart from each other and are arranged along a circumferential path around and spaced apart from the bobbin.

7. A method of manufacturing a coil for a torque sensor, the method comprising:
    holding a bobbin with a jig, the bobbin being formed in a cylindrical shape and provided with first inclined grooves and second inclined grooves on a cylindrical outer peripheral surface of the bobbin, the first inclined grooves being inclined at a preset specified angle with respect to an axial direction of the cylindrical shape, and the second inclined grooves being inclined at the specified angle with respect to the axial direction in a direction opposite to the first inclined grooves; and
    rotating the bobbin while simultaneously supplying insulated wires from nozzles arranged to surround the bobbin, and driving the nozzles in a direction orthogonal to a rotation direction of the bobbin so as to wind the insulated wires around the bobbin along the first inclined grooves or the second inclined grooves,
    wherein the method further includes using four nozzles, as the nozzles, arranged at every 90 degrees to surround the bobbin.

8. The method according to claim 7,
    wherein the bobbin has intersections for the first inclined grooves and the second inclined grooves, the intersections indicating portions where the first inclined grooves and the second inclined grooves intersect at substantially center of the bobbin in the axial direction, and
    wherein the method further comprises sequentially stacking first wires and second wires at the intersections, the first wires being the insulated wires to be arranged along the first inclined grooves, and the second wires being the insulated wires to be arranged along the second inclined grooves.

9. The method according to claim 8, further comprising stacking the same number of the first wires and the second wires at the intersections.

10. The method according to claim 7, wherein the first inclined grooves are formed to be inclined at +45 degrees with respect to the axial direction, and wherein the second inclined grooves are formed to be inclined at −45 degrees with respect to the axial direction.

11. The method according to claim 7, wherein the bobbin further includes:
   a first side passage formed on the cylindrical outer peripheral surface on one side in the axial direction of the cylindrical shape, and
   a second side passage formed on the cylindrical outer peripheral surface on the other side opposite to the one side in the axial direction of the cylindrical shape,
   wherein when the insulated wires are wound around the bobbin so as to form one parallelogram along two adjacent first inclined grooves, a part of the first side passage, and a part of the second side passage, the insulated wires are wound around the bobbin along the first side passage and the second side passage in a same direction, and
   wherein when the insulated wires are wound around the bobbin so as to form one parallelogram along two adjacent second inclined grooves, a part of the first side passage, and a part of the second side passage, the insulated wires are wound along the first side passage and the second side passage in the same direction.

12. The method according to claim 7, wherein the nozzles are spaced apart from each other and are arranged along a circumferential path around and spaced apart from the bobbin.

* * * * *